A. O. THOMAS.
PROCESS OF MOLDING ARTIFICIAL STONE BUILDING BLOCKS.
APPLICATION FILED OCT. 12, 1907.

958,194. Patented May 17, 1910.

WITNESSES
Chas. N. Davies.
Myron G. Clear

INVENTOR
Augustus O. Thomas,
by C. L. Parker
Attorney

UNITED STATES PATENT OFFICE.

AUGUSTUS O. THOMAS, OF KEARNEY, NEBRASKA.

PROCESS OF MOLDING ARTIFICIAL-STONE BUILDING-BLOCKS.

958,194.

Specification of Letters Patent.   Patented May 17, 1910.

Application filed October 12, 1907. Serial No. 397,221.

*To all whom it may concern:*

Be it known that I, AUGUSTUS O. THOMAS, a citizen of the United States, residing at Kearney, in the county of Buffalo and State of Nebraska, have invented certain new and useful Improvements in Processes of Molding Artificial-Stone Building-Blocks, of which the following is a specification.

My invention relates to a new and improved process of molding artificial stone building blocks and the like, and particularly contemplates the provision of a process whereby the block may be molded and handled at once, and whereby its usefulness and strength will be equal to that of a wet mold block which could not be handled before twenty-five or thirty-six hours.

My invention further and specifically resides in the following process of molding artificial stone building blocks as will be hereinafter particularly described with reference to the accompanying drawings forming a part of this specification, in which—

Figure 1:
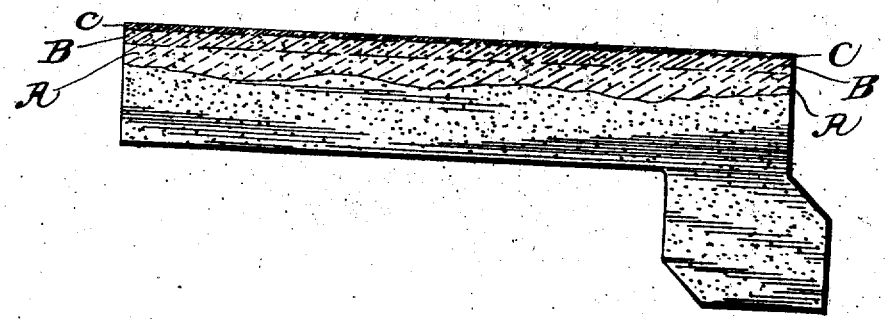
Figure 2:
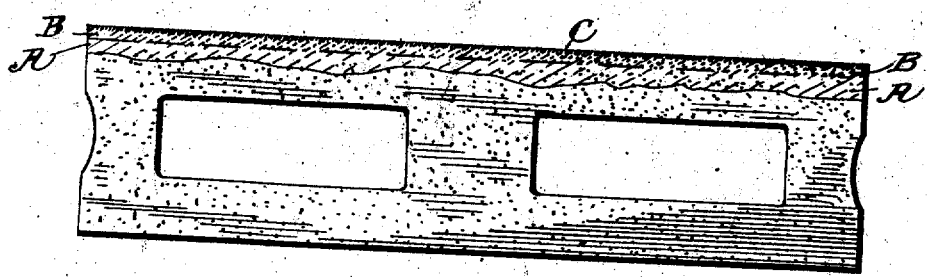

Figure 1 is a plan view partly in section of a building block constructed according to my process, and Fig. 2 is a similar view of a modified form of building block constructed in accordance with my process.

According to my invention I aim to provide a building block comprising a body A composed of coarse aggregates and a comparatively small percentage of moisture, being thus made in low plasticity which gives the opportunity of handling the product immediately. The face B of this block comprises a mixture of finely divided aggregates formed in a state of high plasticity, that is with moisture sufficient to render the same into a thoroughly plastic mass. Making the body A of the block of low plasticity and the face B of a high plasticity, gives an opportunity of working the material and at the same time bringing out the virtues of the cement and making the block of sufficient moisture in the mixture, to produce perfect crystallization and to produce stone instead of merely cemented sand and gravel. This block is floated with some pressure which closes the pores in the cement to further the opportunity of working the material properly and the surface is preferably sifted over with finely crushed marble or stone C properly mixed with Portland cement to produce a beautifying crystallized effect.

The addition of the powdered marble or other stone mixed with cement serves the immediate purpose of forming a very thin outside layer on the face of high plasticity preventing, by a thickening or stiffening action, the surface tendency to run, due to the oozing of the water to the surface, and thereby enables the block to be handled and used considerably earlier than would be otherwise possible. The powder further serves to prevent the escape of moisture from the face of high plasticity either by drip or evaporation.

When a mixture is made very dry as heretofore in molding blocks, it is hard to get sufficient water to produce perfect crystallization, while the facing of high plasticity provided by my process uses all the water that is necessary for perfect crystallization.

Having thus fully described my invention, I claim:

An improvement in making building blocks, which consists in forming the body portion thereof, of a mixture of coarse aggregates made in low plasticity, in forming a facing for the outer side of said body portion of a mixture of finely divided aggregates in high plasticity for furnishing sufficient moisture for the crystallization of said body portion, and in forming on the surface of said facing a thin layer in low plasticity by sifting on such surface powdered stone and cement to stiffen the surface of the facing and prevent the escape of moisture therefrom, substantially as described.

In testimony whereof I affix my signature in presence of two witnesses.

AUGUSTUS O. THOMAS.

Witnesses:
S. L. GARRETT,
VIRGINIA MERCER.